Figure 1:
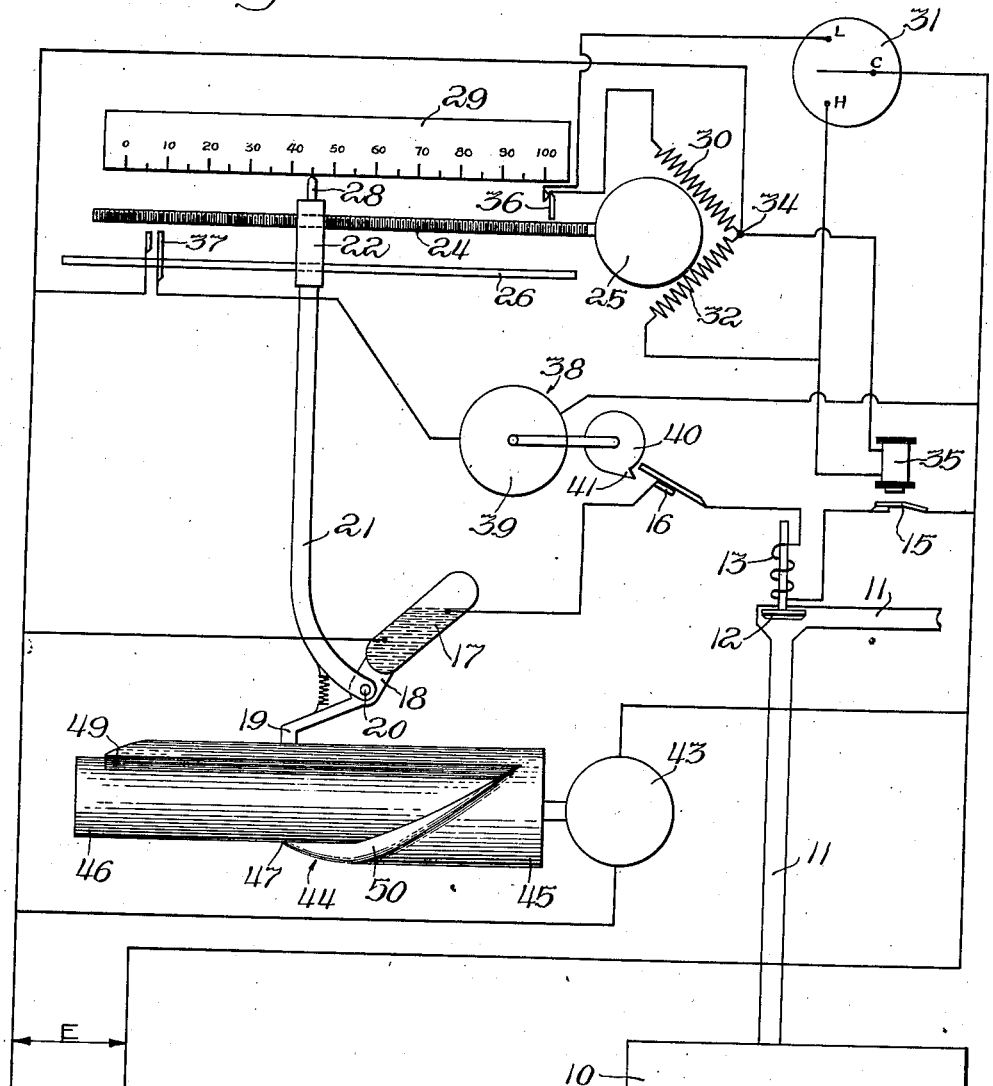

Oct. 21, 1941.  P. E. CARY  2,259,877
CONTROL SYSTEM
Filed June 25, 1938

Inventor
Philip E. Cary.
By [signature]
Att'y.

Patented Oct. 21, 1941

2,259,877

UNITED STATES PATENT OFFICE 2,259,877

CONTROL SYSTEM

Philip E. Cary, Chicago, Ill.

Application June 25, 1938, Serial No. 215,832

6 Claims. (Cl. 236—46)

This invention relates to a control system. More specifically it relates to a control system for a furnace by which it is possible to determine when an article being heated in the furnace has reached a given temperature.

Furnace control systems are well known, which control the supply of heat to a furnace to bring the furnace up to a predetermined temperature and to maintain the furnace at that temperature. Normally, this is effected by means of a thermostat. With such an arrangement there is no definite assurance that an article being heated in the furnace has reached the particular temperature, because a thermometer would show the temperature of the gas within the furnace rather than the temperature of the article being heated. There is always some lag between the time the gas in the furnace reaches a given temperature and the time the article itself attains that temperature. Consequently, it has been the practice to have the controls so arranged that, when the furnace itself reaches the temperature, a timing relay is actuated, which will shut off the furnace a certain time later. This arrangement gives only a very rough approximation of the proper time to shut off the furnace, for the lag in time between furnace temperature and article temperature varies with the size and quantity of articles being heated. It is, consequently, desirable to shut off the furnace more nearly at a time when the article being heated has reached the given temperature.

An object of the invention is to provide a control system for shutting off the heat supplied to a furnace when an article being heated has reached a predetermined temperature.

A further object is the provision of a control system which is operative to shut off the supply of fuel to a furnace when the heat supplied to the furnace has reached a minimum.

Another object is to provide a control system for cutting off the transfer of heat with respect to an article when the article has reached a predetermined temperature with the transfer of heat at a minimum.

Still another object is to provide a cut-off relay in connection with a heating control system, which regulates the amount of fuel supplied to a furnace to keep the temperature at a predetermined level.

Other objects will be apparent from the disclosure.

According to the present invention, gas is supplied to a furnace to heat the same. A thermostat regulates the amount of gas supplied to the furnace to bring the temperature up to, and to maintain it at, a certain level. A timing relay is actuated to shut off completely the supply of gas to the furnace a certain time after the amount of gas supplied to the furnace is slightly above the minimum required to keep the furnace at the predetermined temperature level. When the amount of heat supplied has reached this minimum, heat is supplied only to offset furnace losses, and the article being heated has been brought to the predetermined temperature.

In the drawing—

Figure 2:
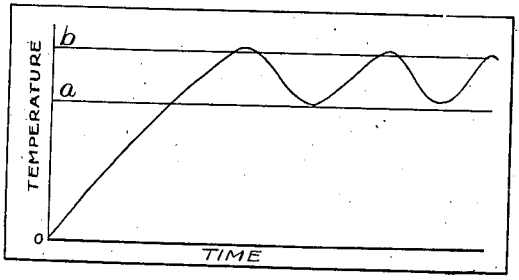

Figure 1 is a schematic showing of the novel control system for regulating the heating of a furnace; and, Figure 2 is a graph, showing how the temperature is maintained in the furnace.

A furnace 10, which is adapted to contain articles to be heated, is supplied with gas for heating through a pipe 11 having a valve 12 at a bend thereof.

The valve is controlled by a solenoid 13. In series with the solenoid 13 are switches 15 and 16, and a mercury switch 17. The mercury switch is secured to a member 18 having a follower portion 19. The member 18 is pivoted at 20 on an arm 21 carried by a member 22. This member, which may be considered a nut, has a threaded opening in which a screw 24 driven by a reversible motor 25 engages. A rod 26, fixed in spaced relation to the screw 24, passes through the nut 22, preventing rotation of the nut and causing rotation of the screw to effect movement of the nut along the screw. A pointer 28 extends from the nut opposite a scale 29 divided to indicate percentages from 0 to 100.

The reversible motor 25 has a winding 30, connected to the low side L of a thermostat 31 responsive to temperature of the furnace 10, and a winding 32 connected to the high side H. The two windings are connected at 34 and either winding is in parallel with the line containing the solenoid 13 and switches 15, 16 and 17 when the common point C is connected either to H or L. A relay 35, placed in parallel with the winding 32, opens the switch 15 when current passes through the relay. There is a limit switch 36 between the winding 30 and the point L of the thermostat, the switch being opened by movement of the nut 22 against it.

A limit switch 37 is placed adjacent the screw 24 at any suitable point along the length, so that the switch is closed when the nut 22 strikes it. The limit switch 37 is in a line in series with a timing relay 38 diagrammatically illustrated by a motor 39 and a rotating element 40 driven by the motor and having a projection 41 capable of opening the switch 16. The line containing the limit switch 37 and the timing relay 38 is in parallel with the solenoid 13 and switches 15, 16 and 17.

Also, in parallel therewith is a constant speed motor 43 driving a cam 44. This cam has a portion 45 at one end, of large diameter, and a portion 46 at the other end, of small diameter. The intermediate part 47 of the cam is so shaped that at any transverse section thereof is a portion of small diameter and a portion of large diameter, and the sections vary progressively from the small end to the large end, so that the percentage of small diameter varies from 100 to 0, and the percentage of large diameter, from 0 to 100. The follower portion 19 of the member 18 is adapted to contact the surface of the cam. When the follower contacts the part of large diameter, as shown in Figure 1, the mercury switch 17 is closed. When the follower contacts the part of small diameter, the switch moves to a more nearly vertical position and is open.

The cam is adapted to rotate in a direction with the portion visible in the drawing moving upwardly, and, as it does so, it passes abruptly from a surface of large diameter to one of small diameter over a straight radially extending surface 49. A sloping, spirally extending surface 50 also connects the portion of large and small diameter. The passage of the follower from small diameter is effected to large diameter gradually and easily over this sloping surface. It will be seen that, when the follower 19 is intermediate the ends of the cam 44, the follower rides for each revolution of the cam a certain amount on a surface of large diameter and for the remainder, on a surface of small diameter. The percentage of each revolution spent by the follower on surface of large diameter, and, consequently, the percentage of time the mercury switch 17 is closed, is indicated by the pointer 28 on the scale 29.

In operation, a charge to be heated is placed in the furnace 10. The thermostat 31 is set for the temperature to be reached as represented by the line b in the graph of Figure 2, as well as for a slightly lower temperature represented by the line a. A voltage E is applied across the lines. The temperature of the furnace at the outset being well below line a as shown in the graph, there is a connection between C and L on the thermostat, and current flows through winding 30 of the reversible motor 25, so that the screw 24 is rotated in a direction such as to move nut 22 to the 100% end of the scale 29. This means that the follower 19 of the member 18 supporting the mercury switch 17 is in contact with the enlarged end 45 of the cam 44 and the switch 17 is continuously closed. Current flows through the solenoid 13, and the valve 12 is held open all the time. When the nut 22 comes opposite the 100% point on the scale 29, it strikes and opens the limit switch 36, so that the motor 25 stops rotating and the nut moves no farther.

The furnace continues to be heated and the temperature rises above the temperature represented by line a on the graph a small amount below the temperature to be reached by the charge. When this happens, the connection between L and C of the thermostat is broken and the thermostat is in the neutral position, as actually shown in Figure 1. The temperature continues to rise and, when it passes above the temperature to be reached, represented by line b in the graph, a connection between H and C of the thermostat is established. This means that current flows through winding 32, and reversible motor 25 is rotated in a direction to move the nut 22 toward the 0% end of the scale 29. Simultaneously therewith, a current is sent through relay 35, which is energized to open switch 15. Consequently, no current flows through solenoid 13, and the valve 12 closes to cut off the supply of heating gas to furnace 10.

With the supply of heat to the furnace cut off, the temperature drops below line b on the graph, and connection between H and C in the thermostat is broken. Consequently, since no current flows through winding 32, motor 25, screw 24 and nut 22 stop. Also no current flows through relay 35, and switch 15 closes. This means that solenoid 13 is energized, and valve 12 is opened, admitting gas to furnace 10. However, nut 22 has moved down screw 24 sufficiently so that follower 19 contacts a section of cam 44, which may have, for example, 80% large diameter and 20% small diameter. This means that switch 17 is closed 80% of the time and open 20%, solenoid 13 is energized 80% of the time and valve 12 is open 80% of the time, to admit gas to the furnace, and closed 20%.

This condition continues for a time until the temperature again rises above line b, as shown in the graph. Then there is a repetition of what happened when the temperature was previously above line b. Connection between H and C on the thermostat is made. Current flows through winding 32 to rotate motor 25 to move nut 22 further down scale 29, and follower 19 further down cam 44. Current energizes relay 35 so as to open switch 15 and cause valve 12 to close, shutting off supply of gas to furnace. The temperature again drops below line b, connection between H and C is broken, motor 25 and nut 22 are stopped, switch 15 is closed, solenoid 13 again is energized, and valve 12 again is opened to admit gas to furnace 10. Now the nut 22 and follower 19 occupy a new position relative to the scale 29 and cam 44, for example, one to keep mercury switch 17 closed 60% of the time and open 40%. This means that valve 12 is open 60% of the time and closed 40%.

This condition continues until the temperature again rises above line b, when the cycle of operations repeats itself, with the follower 19 occupying a position closer and closer to the small end 46 of the cam 44, and the valve 12 is open less and less of the time. Eventually, a point is reached where the follower 19 moves no closer to the small end of the cam 44 and the percentage of time during which the valve 12 is open does not decrease. This is an indication that the load in the furnace has reached the temperature for which the thermostat is set, heat being supplied to the furnace only to balance the heat losses, which are constant. This is the point at which the furnace should be shut off, since the load has been brought to temperature, and it is purposeless to continue heating. This point will have been determined in advance by experiment by a number of trial runs of the furnace, with or without a charge. As a matter of fact, the same point will not be reached for each trial because of slight variation in surrounding conditions, such as the outside temperature, and a zone of minimum points rather than one point will be reached.

The limit switch 37 has been placed in the path of the nut 22 at a point such that the nut will strike and close the switch at the highest percentage for the zone of minimum points previously determined by experiment. When the limit switch 37 is closed, the timing relay 38 is energized so as to operate and open the switch 16. This means a deenergization of the solenoid 13 and closing of the valve 12, cutting off the supply of heat to the furnace 10. The timing relay is shown as composed of a motor 39 and disk 40 with projection 41 set so as to cause projection 41 to contact and open switch 16 after any predetermined period. The period may be varied by a variation of the speed of motor 39 and rotation of disk 40 through a fixed angle or by a variation of angle through which the disk moves with the speed of the motor held constant. Normally, there will be some speed reducing means between the motor and disk, so that several minutes may elapse with a single rotation of the disk. Any other suitable timing relay may be used.

As previously stated, the correct time to shut off the furnace is theoretically that time at which the heat supplied to the furnace reaches a minimum necessary to balance heat losses. This point is very hard to determine accurately, and in operation the nut 22 might come within a very few percentage points of striking and closing the limit switch 37 to actuate any instantaneous relay for opening the valve solenoid current and yet not actually close the switch 37. Consequently, as a substitute for shutting off the furnace immediately at the minimum point, the present scheme has been devised by which the switch is closed a slight amount before the minimum point, and the furnace is shut a definite time thereafter. In this way shutting off at the minimum point is approximated.

It may happen for some reason, such as change in temperature conditions outside the furnace, that, during the movement of the nut 22 from its 100% position down to the minimum point, its position is too far along the scale toward the minimum point and the mercury switch 17 is open too great a percentage of the time, so that insufficient heat is supplied, and the temperature falls below line *a* on the graph. Then connection is established between L and C on thermostat 31, and motor 25 is rotated by current in winding 30 in a direction to bring nut 22 toward the 100% of scale 29. Consequently, the percentage of time during which the valve 12 remains open is increased, because of movement of follower 19 toward the large end 45 of the cam 44. This means that more heat is supplied to the furnace, and the temperature again rises above line *a*.

Previous operation of the above described type of apparatus with thermostatic control of the supply of heat has been without a limit switch or other device for shutting off the furnace when the supply of heat reaches a minimum. In some instances, a timing relay has been used to shut off the furnace a predetermined time after the temperature of the furnace first reached the desired level, in the hope that the charge within the furnace would have reached that temperature after elapse of the predetermined time. This time would necessarily vary with the size of the load, and so many times would have to be determined by trial for the various loads.

With the novel control system of the present invention the size of the load has no effect on operation. The timing relay for shutting off the furnace is set to operate a slight amount above the minimum point necessary to maintain the desired temperature in the furnace. This point will not vary with the size of the load although the time necessary to reach it may vary. The only thing that may affect the minimum point is the temperature outside the furnace. Compensation for this is had by the taking of a number of trial runs at various outside temperatures and the setting of the closing of the timing relay at the top of the zone of the various minimum points.

It will be apparent that the above described invention is not limited to the particular heating apparatus and control therefor shown. It may be applied in any case where heat is transferred in progressively decreasing amounts down to a minimum in an effort to maintain a constant temperature.

The intention is to limit the invention only in terms of the appended claims.

What is claimed is:

1. In combination, a furnace, a pipe for supplying fuel to the furnace, a valve in the pipe for regulating the flow of fuel through the pipe, means for controlling the valve comprising a rotating cam of considerable length of small diameter at one end and large diameter at the other end and at intermediate sections, being of both diameters in progressively varying amounts, a solenoid for operating the valve, a source of power and a mercury switch in series with the solenoid, said mercury switch being adapted to move along the cam and to open or close as it moves over the small diameter or the large diameter of the cam, a device responsive to two thermal conditions of the furnace for varying the position of the mercury switch along the length of the cam, and a timing relay for breaking the circuit comprising the solenoid, mercury switch and source of power, said timing relay being actuated by the movement of the mercury switch beyond a certain point toward the end of the small diameter of the cam.

2. In combination, a furnace, a pipe for supplying fuel to the furnace, a valve for regulating the amount of fuel supplied by the pipe, an elongated cam of small diameter at one end and of large diameter at the other end and of both diameters in progressively varying amounts from one end to the other, a follower operatively connected with the valve adapted to contact the cam at its small diameter and large diameter for holding the valve open or closed, a device responsive to two temperature conditions in the furnace, a reversible motor controlled by the device, a screw driven by the motor, a nut mounted on the screw and carrying the follower, said nut being movable lengthwise of the screw as it rotates for moving the follower lengthwise of the cam, and a timing relay adapted to be actuated by movement of the nut beyond a certain point in a direction bringing the follower toward the small end of the cam for closing the valve.

3. In combination, a furnace, means for supplying fuel to the furnace to bring a charge within the furnace to a predetermined elevated temperature, progressively movable means for controlling and bringing the fuel supply to a minimum necessary to maintain the furnace at the said predetermined temperature, means for cutting off the fuel supplied to the furnace approximately at the point the fuel supplied to the furnace reaches the said minimum, and means connected with the fuel-supply controlling means for actuating said cutting-off means by arrival of the fuel-supply controlling means at a point predetermined as indicative of the approximate time the fuel supply reaches a minimum.

4. In combination, a furnace, means for supplying fuel to the furnace, means responsive to the temperature condition of the furnace for reducing the amount of fuel supplied to a minimum sufficient to maintain the furnace at a predetermined temperature, means for cutting off the supply of fuel to the furnace a predetermined time after the amount of fuel being supplied has reached a value a predetermined amount above the minimum value for maintaining the predetermined temperature in the furnace, and means connected with the fuel-supply controlling means for actuating said cutting-off means by arrival of the temperature-responsive means at a point predetermined as indicative of the approximate time the fuel supply reaches a minimum.

5. In combination, a container, means for transferring heat with respect to the container to a certain predetermined temperature, progressively movable means for controlling and bringing the rate of transfer of heat with respect to the container to a minimum sufficient to maintain the container at the said predetermined temperature, means for cutting off the transfer of heat with respect to the container approximately at the time the rate of transfer of heat reaches the said minimum, and means connected with heat-transfer control means for actuating said cutting-off means by arrival of the heat-transfer control means at a point predetermined as indicative of the approximate time the fuel supply reaches a minimum.

6. In combination, a container adapted to hold an article to be treated, means for transferring energy with respect to the container for treatment of the article, progressively movable means responsive to a condition in the container for reducing the rate of transfer of energy with respect to the container to a minimum sufficient to maintain said condition in the container, means for cutting off the transfer of energy with respect to the container approximately at the time the rate of transfer of energy has reached the minimum necessary to maintain the said condition in the container, and means connected with the energy-transfer reducing means for actuating the said cutting-off means by arrival of the energy-transfer reducing means at a point predetermined as indicative of the approximate time the rate of transfer of energy reaches a minimum.

PHILIP E. CARY.